(12) United States Patent
Kessler

(10) Patent No.: US 6,886,232 B2
(45) Date of Patent: May 3, 2005

(54) WIPER ARMS, AND METHOD FOR PRODUCING WIPER ARMS

(75) Inventor: Peter Kessler, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 350 days.

(21) Appl. No.: 10/025,507

(22) Filed: Dec. 19, 2001

(65) Prior Publication Data

US 2002/0083547 A1 Jul. 4, 2002

(30) Foreign Application Priority Data

Jan. 3, 2001 (DE) .......................... 101 00 020

(51) Int. Cl.⁷ .............................. B23P 17/00; B60S 1/32
(52) U.S. Cl. ................ 29/412; 15/350.351; 15/350.352
(58) Field of Search ............... 29/412–417; 15/250.351, 15/250.352

(56) References Cited

U.S. PATENT DOCUMENTS

| | | | |
|---|---|---|---|
| 2,312,278 A | | 2/1943 | Zaiger |
| 4,133,071 A | | 1/1979 | Jaske |
| 4,264,998 A | * | 5/1981 | Stratton .................. 15/250.453 |
| 4,793,020 A | * | 12/1988 | Stratton et al. .......... 15/250.46 |
| 5,697,156 A | * | 12/1997 | Buechele .................... 29/897.2 |
| 6,505,377 B1 | * | 1/2003 | Merkel et al. .......... 15/250.351 |
| 2003/0005541 A1 | * | 1/2003 | Merkel et al. .......... 15/250.351 |

FOREIGN PATENT DOCUMENTS

| | | |
|---|---|---|
| AU | 545 089 | 5/1985 |
| DE | 1 814 442 | 6/1970 |
| DE | 19615867 | * 10/1997 |
| DE | 196 20 355 | 11/1997 |
| DE | 198 07 845 A1 | 8/1999 |
| EP | 0739795 A1 | * 10/1996 |
| EP | 0783999 A1 | * 7/1997 |
| FR | 2563482 | * 10/1985 |
| GB | 2 268 433 A | 1/1984 |

* cited by examiner

*Primary Examiner*—Eric Compton
(74) *Attorney, Agent, or Firm*—Michael J. Striker

(57) ABSTRACT

In a method for producing wiper arm and a wiper arm produced by the method a tongue for a rotary angle limiting is punched on a hinge part and correlates with a recess in the hinge part.

4 Claims, 2 Drawing Sheets

WIPER ARMS, AND METHOD FOR PRODUCING WIPER ARMS

BACKGROUND OF THE INVENTION

The present invention relates to a method for producing a wiper arm, and to a wiper arm which is produced by this method.

Numerous methods for producing wiper arms, as well as numerous wiper arms are known in the art. These methods deal with a mass production of so-called punch-bending methods, in which the wiper arms are punched from metal plates and then bent. Normally the punched parts are arranged so that they produce as less rejects as possible, to minimize the material costs. For this purpose the hinge parts have a rectangular basic contour, which minimizes the material consumption by alternating opposite arrangements. The existing methods can be further improved.

SUMMARY OF THE INVENTION

Accordingly, it is an object of the present invention to provide wiper arms, as well as methods for producing wiper arms, which avoid the disadvantages of the prior art.

In keeping with these objects and with others which will become apparent hereinafter, one feature of the present invention resides, briefly stated, in a method fo producing wiper arms for a motor vehicle, comprising the steps producing at least one element with a punch-bending process; punching out from the at least one part at least two alternating-side oppositely located parts; punching in at least at one side of one of said two parts a tongue projecting outwardly beyond a base contour of said one part; punching in the neighboring other of said parts a corresponding recess, so that a predetermined minimum distance between said two parts is not exceeded.

With the inventive method the advantages are provided that by a recessing in a punched part of the wiper arm, which corresponds to the tongue projecting over the basic contour of the part, a predeterminable minimum distance between two parts which are located near one another during punching is not exceeded. Therefore these parts in the series production during punching can be placed closer to one another so as to save a material and thereby to provide a cost advantage. In particular, for the wiper arm produced in a mass production, it constitutes a considerable improvement.

When in accordance with another feature of the present invention the recess is equal or greater than the tongue, advantageously with greater manufacturing tolerances a smaller reject quantity is possible.

When in accordance with another feature of the present invention the recess is selected so that a minimum punch distance is provided, a maximum cost reduction is obtained.

In accordance with present invention also a wiper arm is provided which has at least one part produced from at least one element and having two ends, said at least one part in a region of its first end has a tongue and in a region of its second end has a recess whose surface is at least as great as that of said tongue.

Such a wiper arm has two ends and in the region of its first end has a tongue, for example for rotary angle limit, and its second end has a recess whose surface is at least as great as that of the first tongue. The advantage is that a smaller punching distance of individual parts is provided with this construction. Thereby the wiper arm can be produced simply and in a cost favorable manner.

When the part is formed as a substantially U-shaped profile part with a base and two lateral legs as known for the hinge parts of conventional wiper arms, it can be produced in a cost favorable manner and mounted over a rotary angle limit for limiting the rotary angle of the hinge part relative to the mounting part with the wiper arm on the vehicle. For this purpose it has a tongue extending from the edge of a lateral leg which faces away from the base.

It is especially advantageous when the recess is substantially wider than the tongue since in this manner manufacturing tolerances can be compensated and the reject can be lowered.

It is especially advantageous when the first distance between the outermost edge of the first end of the part and the tongue is approximately equal as the second distance which extends from the outermost edge of the second end of the part to the recess. In this manner corresponding tongues and recesses are optimal, whereby the punching distances can be reduced to a minimum.

When the tongue at the edge of the lateral leg passing away from the base is bent inwardly, it extends substantially parallel to the base of the profile part. Therefore in a simple manner a rotary angle limit of the wiper arm with respect to its mounting can be obtained, which is optically not disturbing.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
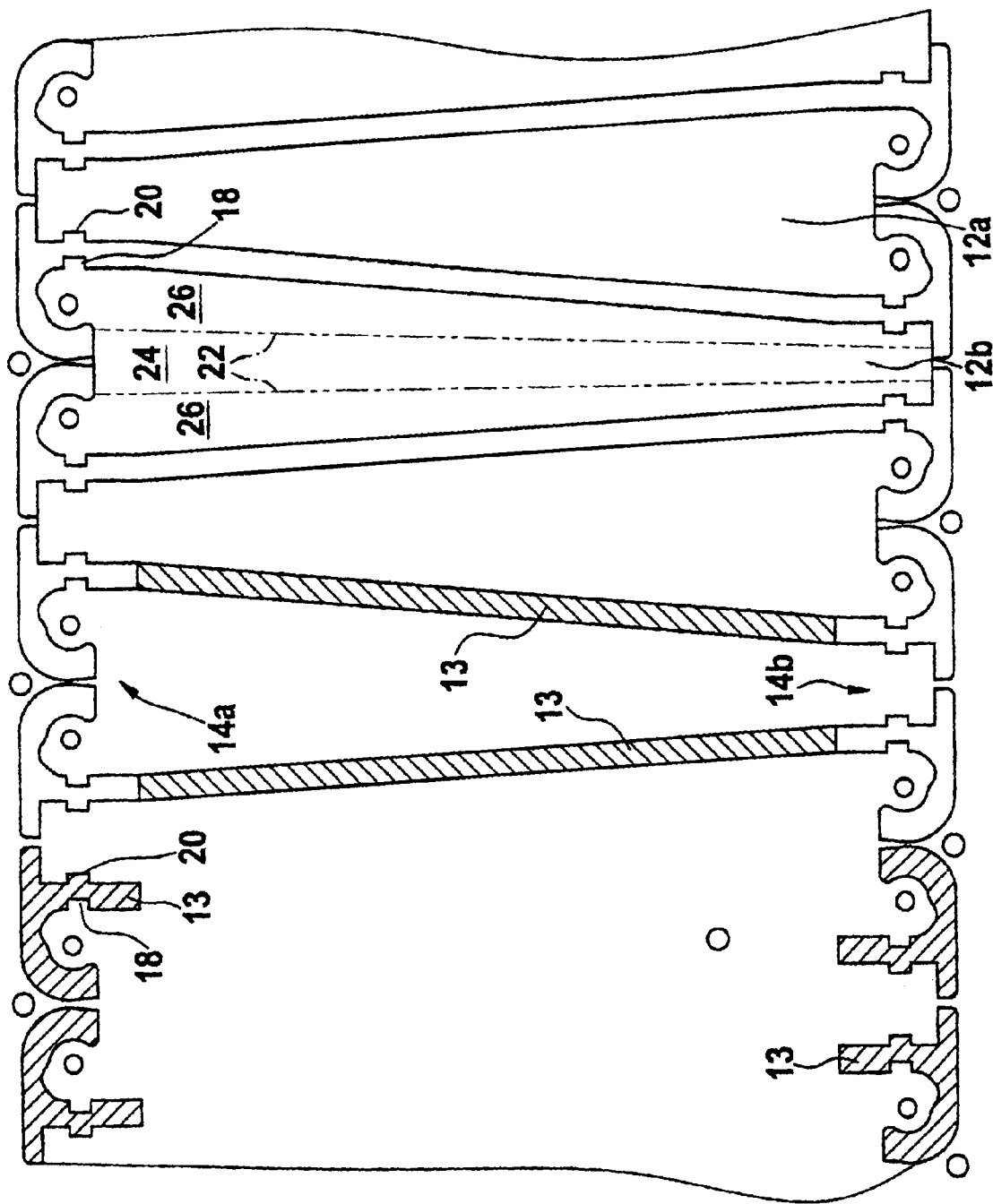
FIG. 1 is a view showing a punch metal plate with plungers of a punching machine on the plan view.
Figure 2:
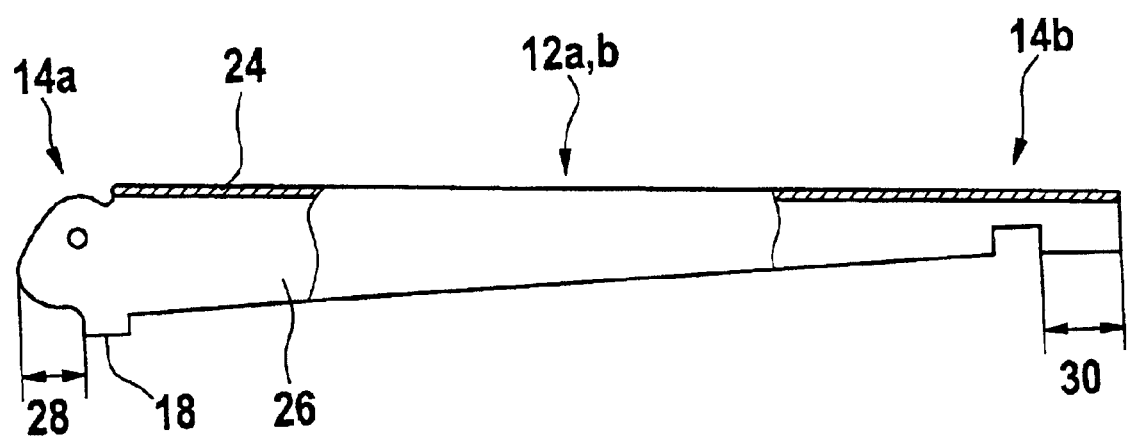
FIG. 2 is a view showing a hinge part of a wiper arm after a bending process in a longitudinal section.

FIG. 1 shows a punch metal plate 10 on a not shown punching machine. The parts 12a, b are the hinge parts of a wiper arm, whose substantial components are shown in FIG. 2. The parts 12a, b are punched out by the plunger 13 from the metal plate 10. They have a first end 14a and a second end 14b. The base contour of the neighboring parts 12a, b corresponds to a triangle, wherein the wider side is identified as the first end 14a and the tip or smaller side as the second end 14b.

The plungers 13, in order to provide clean punching, must have an minimum size, or in other words they do not represent any fine structures. In the region of the first end 14a, the parts 12b have a tongue 18 which extends outwardly beyond the base contour of the part 12a, b. The second part 12a which is arranged near it has at its second end 14b a recess 20. Thereby the edges of the parts 12a and 12b can be punched out cleanly without increasing the distance between the two neighboring parts 12a, 12b as required without the tongue 18.

After the punching, the parts 14a, b are bent along a bending line 22. Therefore a U-shaped profile part is produced with a base 24 and two lateral legs 26.

This is shown in FIG. 2. At the first end 14a, the lateral leg 26 of the part 12a, b has the tongue 18. From the outermost edge of the first end 14*a* of the part 12*a, b*, it has the same first distance 28 as the corresponding recess 20 from the outermost edge of the second end 14*b* of the part 12*a, b*. This second distance 30 must not however be exactly equal. This is only the case when the outermost edge of the first end 14*a* of a part 12*a* on the punch plate 10 coincides with the outermost edge of the second end 14*b* of the part 12*b* which join the part 12*a*. When this is the case, the recess 20 naturally displaces correspondingly.

Since the wiper arms which are used nowadays are provided at the second end 14*b* with a hook-shaped bend, the lateral leg 28 in this region can be bent completely inwardly, so that it extends parallel to the base 24. When the second end 14*b* is deformed to a hook, then the recess 20 can not be seen any longer.

The part 12*a, b* can be also extended by a wiper rod, which at the end facing away from the part has a hook. The second end 14*b* of the part 12*a, b* engages the wiper rod. Thereby the recess 20 can be seen in this region, when the wiper arm mounted on the vehicle is lifted from the windshield.

It will be understood that each of the elements described above, or two or more together, may also find a useful application in other types of methods and constructions differing from the types described above.

While the invention has been illustrated and described as embodied in wiper arms, and method for producing of wiper arms, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A method for producing wiper arms for a motor vehicle, comprising the steps producing at least one element with a punch-bending process; punching out from the at least one element at least two alternating-side oppositely located parts; punching at least at one side of one of said two parts a tongue projecting outwardly beyond a base contour of said one part; punching in the neighboring other of said parts at a side which faces the at least one side of the one part a corresponding recess which corresponds to the tongue, so that a predetermined minimum distance between said two parts is not exceeded.

2. A method as defined in claim 1; and further comprising providing the recess with a surface which at least is equal as that of the tongue.

3. A method as defined in claim 1; and further comprising providing the recess with a surface which is greater than that of the tongue.

4. A method as defined in claim 1; and further comprising selecting the recess so that only a minimal required punching distance is punched out as the recess.

\* \* \* \* \*